Dec. 31, 1957  E. B. MYERS  2,818,521
LAMP
Filed Jan. 14, 1954  2 Sheets-Sheet 1

INVENTOR.
ELMAN B. MYERS

BY Kenyon & Kenyon
ATTORNEYS.

Dec. 31, 1957  E. B. MYERS  2,818,521
LAMP
Filed Jan. 14, 1954  2 Sheets-Sheet 2

INVENTOR.
ELMAN B. MYERS

BY Kenyon & Kenyon
ATTORNEYS.

2,818,521

LAMP

Elman B. Myers, Pompton Lakes, N. J., assignor to Scarborough Associates, Inc., New York, N. Y., a corporation of New York Application January 14, 1954, Serial No. 404,042

7 Claims. (Cl. 313—113)

My invention relates to improvements in lamps, and more particularly in automobile headlight lamps. The principal object of the invention is to produce a lamp capable of producing a brightly illuminated field of substantially uniform intensity without glare, so that an efficient illumination is obtained and the beam from the lamp can be approached without interfering with the vision of one looking toward the lamp.

Another object of the invention is to provide a lamp of the character referred to which is relatively free from optical distortion or aberration, such as spherical and chromatic aberration, coma and astigmatism.

In accordance with my invention I provide a lamp wherein a light emitting element of predetermined shape is combined with a special type of reflector and with optical correcting means so as to produce a beam of light of such a character that a well-defined uniformly illuminated image of the light emitting element is produced without objectionable glare at a predetermined distance from the lamp. Thus, if it is desired to produce a rectangular illuminated area at a desired distance from the headlight of an automobile, a rectangular light emitting element of the same proportions is combined with the reflector and the correcting means in such a way as to create a beam of light producing a suitably enlarged rectangular image of the element at the desired distance.

In order that my invention may be fully understood, attention is directed to the accompanying drawings forming a part of this specification. In the drawings.

Figure 1:
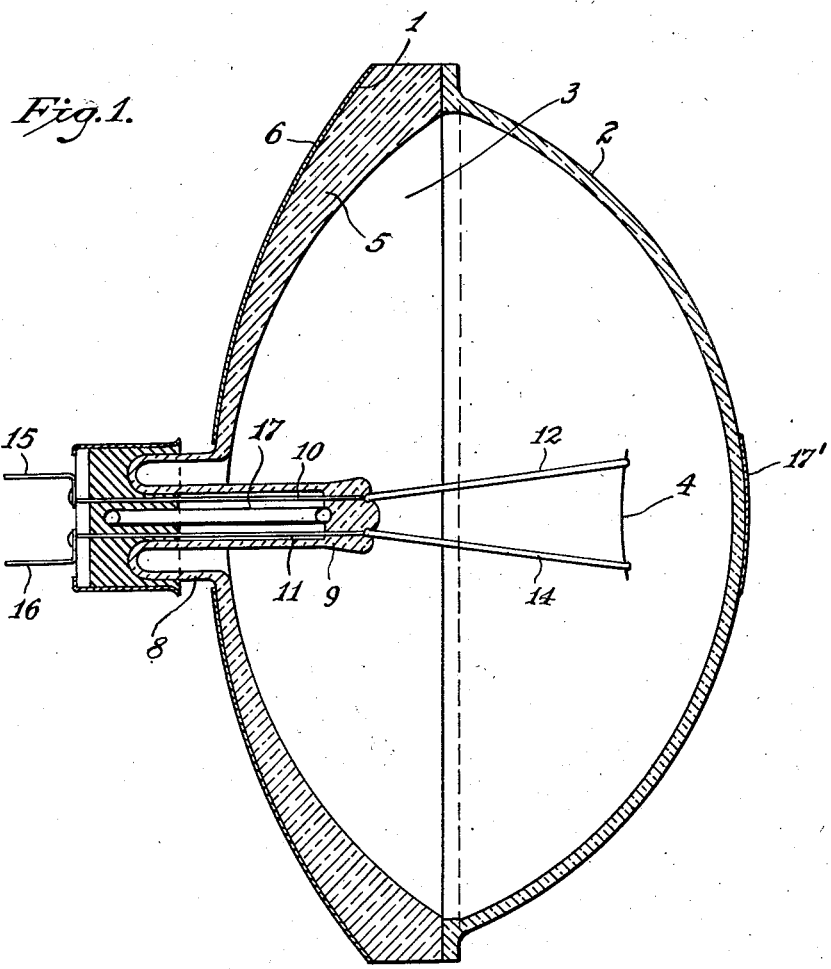
Fig. 1 is a central horizontal sectional view of one embodiment of my invention.

Referring to Fig. 1, a Mangin mirror 1 is secured at its periphery, as by fusion, to a transparent closure 2 of glass or other suitable material so as to form a vacuum chamber 3 in which the light emitting element 4 is enclosed. The closure 2 may have a spherical curvature as shown.

The mirror 1 comprises a glass lens 5 having polished front and rear spherically curved surfaces. The front surface is curved about the focus of the lamp as a center and has a smaller radius of curvature than the rear surface so that the lens has the shape of a diverging meniscus, thicker at its edges than at its center. The rear surface of the lens 5 is mirrored, as with a silver coating, as shown at 6 so as to cause the reflection of light therefrom. The outer surface of coating 6 may be covered with a protective paint.

The Mangin mirror so formed acts upon the light waves incident thereon, both by refraction and reflection, to produce a true image. By properly selecting the curvature of the front and rear surfaces of the lens, the latter serves to correct incident light rays against distortion, such as spherical and chromatic aberration, astigmatism and coma. Furthermore, when a light emitting element is placed at a focal point with respect to the mirror, a sharply defined image thereof is produced and lateral light spreading is relatively low compared with that produced by a parabolic reflector.

To permit the lamp to be readily connected to a source of current, the lens 5 is formed with a rearwardly extending neck 8 and an inwardly extending portion 9 which carries the lead-in wires 10 and 11 and the wires 12—14 for supporting the light emitting element 4 and electrically connecting the same to the lead-in wires. A conventional lamp base is shown with two conductive prongs 15 and 16 which are electrically connected to the lead-in wires and will fit a lamp socket of the type now installed in motor vehicles. To permit exhaustion of the air from the space within the lamp between the lens 5 and cover 2, the neck is formed with the usual air exhaust tube 17 leading from the inside to the outside of the lamp body. After exhaustion of the air from the lamp body, the outer end of the tube 17 is sealed, as usual, so that a vacuum of the desired degree is maintained within the lamp. If desired, a suitable inert gas, such as argon or nitrogen, may be introduced into the lamp body upon the exhaustion of the air. If it is desired to prevent the rays from the front face of the element 4 from passing directly out of the lamp, an opaque shield 17′ may be formed on the outer surface of the cover at the center thereof. The shield may be circular in outline and slightly larger in diameter than the maximum dimension of the element 4.

The light emitting element 4 is placed directly within the evacuated portion of the lamp. It is formed of a suitable electrically conductive high melting point sheet material, such as tungsten. The element 4 is arranged at a focal point with respect to the mirror 1 for producing the image of the element at a predetermined distance from the mirror. One of the faces of the element 4 is directed toward the mirror and is arranged at right angles to the axis of the mirror. The outline of the said element corresponds with that of the area to be illuminated. For example, if an area of rectangular shape, wider than high, is to be illuminated, as is desired with a motor vehicle headlight, the element should be of like rectangular shape with its axis horizontal. Using light emitting elements of other shapes, similarly shaped sharply defined illuminated areas may be obtained at a desired distance from the lamp.

The focal position of the element 4 with respect to the reflector, that is, its distance from the reflector, determines the distance at which a sharp clear image of the element is produced. Accordingly, by proper selection of this position, a clearly sharply defined area of illumination may be obtained at any desired distance. Such focal distance also establishes the horizontal and vertical angles of divergence of the light beam, and accordingly the size of the area illuminated at a predetermined distance; but the light pattern is always that produced by the particular shape of the light emitting element, and there is no appreciable illumination outside of this pattern. Within the pattern, the illumination is substantially uniform. The edges of the element 4 give off very little light.

While the dimensions of my lamp may vary within wide limits, the mirror 1 may, for example, have a diameter of about 7″ and may subtend an angle of about 130°–140° at the focus, the element 4 being in the form of a rectangle having a width of about ¾″, a height of about ⁵⁄₆₄″ and a thickness of about ³⁄₁₀₀₀″. The light emitting element 4 may be positioned so as to produce a light divergence of from 2°–5°, whereby a clear and sharply defined illuminated area is produced at a distance of about 100–180 feet from the lamp.

To increase the flatness of the image of the light producing element, the latter is preferably curved, as shown, with a radius of curvature substantially equal to the radius of curvature of the reflector 6, the convex side of the element being directed towards the concave side of the reflector.

Figure 3:
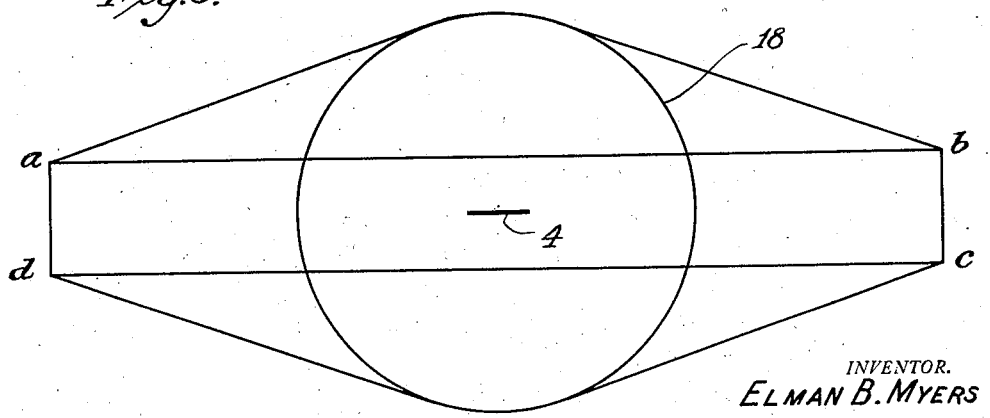
Fig. 3 is a diagram showing the light pattern obtained with the lamps of Figs. 1 and 2, viewed from a point in front of the lamp.

Referring to Fig. 3, the cross section of the light beam at the exit edge of the mirror 1 is a circle, as shown at 18. This circle of light resolves gradually into a true image of the light emitting element at a predetermined distance from the lamp. As shown, the light emitting element 4 is of rectangular shape and the image thereof is of like shape and very much enlarged as shown at $a$, $b$, $c$, $d$.

The above described lamp produces an image of the light emitting element with a high efficiency of light transmission and a freedom from scattered glare producing rays. The illumination over the entire field of light is substantially uniform, and the cut-off of light at the edges of the field is practically complete. As a result, a motorist is enabled to see clearly all objects, both animate and inanimate, in the illuminated region; and there is an absence of glare to a motorist in an approaching vehicle, as the upper edges of the beam of light are below his eyes and there are no scattered glare-producing rays.

Figure 2:
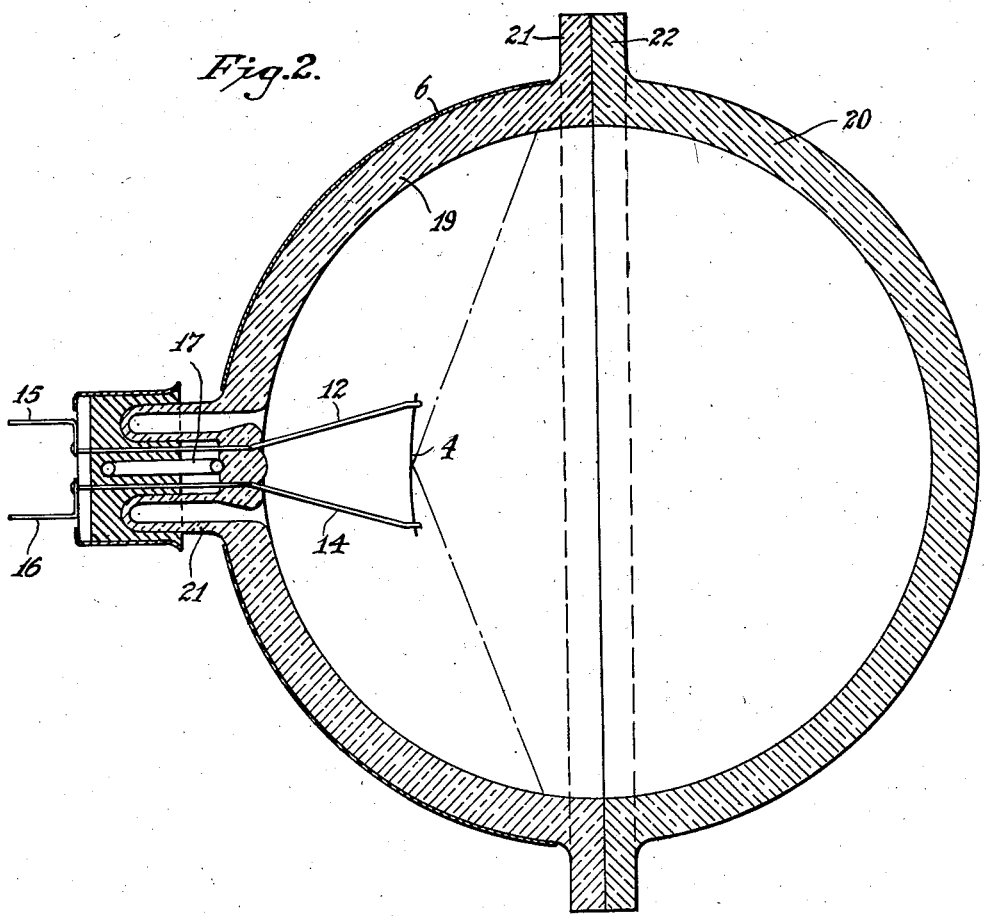
Fig. 2 is a like view of another embodiment of my invention.

Fig. 2 shows a modification of my invention in which the optical correction is made by the employment of concentric meniscus lenses, that is, by lenses of uniform focus in which the front and rear surfaces are spherically curved about the same center. One of these lenses is shown at 19, the other at 20. The lens 19 is formed with a neck 21 supporting a base, lead-in wires, a light emitting element and an air exhaust tube the same as in Fig. 1. It is also provided with a mirrored rear surface 6. Both the lens 19 and the lens 20 are of hemispherical shape and are formed with peripheral flanges 21, 22 which are fused together so as to produce a spherical envelope for the light emitting element 4. The envelope is exhausted of air in the same way as that of Fig. 1.

It has been found that the optical effect of a ray of light is the same upon spherical concentric meniscus lenses of the same shape placed in opposite symmetrical positions with respect to each other with respect to a common center of curvature, so that their concave surfaces face each other. The lenses 19 and 20 are meniscus lenses so arranged and having the same uniform thickness and refractive index. The lens 20, constituting a cover of the lamp, is the reverse of the lens 19 in shape and position. The resultant lamp is accordingly optically symmetrical. Accordingly, each of them produces a correcting effect upon the light rays so that the resultant image is very true. The reflector 6 of Fig. 2, being hemispherical in shape, subtends a very large angle of illumination of rays from the element 4, as will be seen by the dot and dash lines in Fig. 2. While this lamp may have many uses, it is especially suited for use as a headlight for motor vehicles.

It is to be understood that my invention is not limited to the specific structures and uses referred to above, and that modifications may be made without departing from the spirit of my invention as defined in the annexed claims.

What I claim is:

1. A lamp for producing a sharply-defined illuminated area comprising a Mangin reflector, a light emitting element of electrically conductive high melting point sheet material having the outline of said area to be illuminated and having one of its faces directed towards said reflector, said element being mounted at a focal point with respect to said reflector for producing an enlarged image of said element at a predetermined distance from said reflector, and a transparent closure for the front of the lamp, the space between said mirror and closure being exhausted of air and said light emitting element being arranged directly in said exhausted space.

2. A lamp for producing a sharply-defined illuminated rectangular area comprising a Mangin reflector, a light emitting element of electrically conductive high melting point sheet material having the outline of said area to be illuminated and having one of its faces directed towards said reflector, said element having a rectangular outline with its longitudinal axis substantially horizontal and being mounted at a focal point with respect to said reflector for producing an enlarged illuminated image of said element at a predetermined distance from the lamp, and a transparent closure for the front of the lamp, the said mirror and closure forming a vacuum chamber enclosing said light producing element.

3. A lamp for producing a sharply-defined illuminated rectangular area comprising a Mangin reflector having front and rear spherically curved surfaces, the front surface having a smaller radius of curvature than the rear surface, the rear surface being reflecting, a curved light emitting element of electrically conductive high melting point sheet material having the outline of said area to be illuminated and having one of its faces directed towards the front surface of said reflector, said element having a rectangular outline with its longitudinal axis substantially horizontal and having a radius of curvature substantially equal to the radius of the reflecting surface of the mirror and having its convex side directed towards the concave side of the mirror, said element being mounted at a focal point with respect to said reflector for producing an enlarged illuminated image of said element at a predetermined distance from the lamp, and a transparent closure for the front of the lamp, the said mirror and closure forming a vacuum chamber enclosing said light emitting element.

4. A lamp for producing a sharply-defined illuminated rectangular area comprising a Mangin reflector having front and rear spherically curved surfaces, the front surface having a smaller radius of curvature than the rear surface, the rear surface being reflecting, a curved light emitting element of electrically conductive high melting point sheet material having the outline of said area to be illuminated and having one of its faces directed towards the front surface of said reflector, said element having a rectangular outline with its longitudinal axis substantially horizontal and having a radius of curvature substantially equal to the radius of the reflector and having its convex side directed towards the concave side of the mirror, said element being mounted at a focal point with respect to said reflector for producing an enlarged illuminated image of said element at a predetermined distance from the lamp, a transparent closure for the front of the lamp, the said mirror and closure forming a vacuum chamber enclosing said light emitting element, and a shield arranged at the center of the cover for preventing direct transmission from the lamp of light from the front face of the light emitting element.

5. A lamp for producing a sharply-defined illuminated area comprising a Mangin reflector, and an incandescible element having a sheet-like formation, said element being disposed at a focal point with respect to said reflector to produce an enlarged image of the face of said element at a predetermined distance from said lamp, whereby light from said lamp is substantially cut off outside of said image.

6. A lamp for producing a sharply-defined illuminated area comprising a Mangin reflector provided with front and rear spherically curved surfaces, the front surface having a smaller radius of curvature than the rear surface, and a reflecting coating applied to the rear surface, an incandescible element having a sheet-like formation disposed at a focal point with respect to said reflector and perpendicularly relative to the axis thereof to produce an enlarged illuminated image of said element at a predetermined distance from said lamp, whereby light from said lamp is substantially cut off outside of said image.

7. A lamp for producing a sharply-defined illuminated area comprising a Mangin reflector provided with front and rear spherically curved surfaces, the front surface having a smaller radius of curvature than the rear surface, and a reflecting coating applied to the rear surface, a ribbon-shaped filament disposed at a focal point with respect to said reflector, the face of said filament being directed towards said reflector, the longitudinal axis of said filament being disposed perpendicularly relative to the axis of the reflector to produce an illuminated image of said face at a predetermined distance from said lamp.

References Cited in the file of this patent

UNITED STATES PATENTS

| | | | |
|---|---|---|---|
| Re. 22,497 | Adler | June 20, | 1944 |
| 299,885 | Welsh | June 3, | 1884 |
| 1,239,371 | Evans | Sept. 4, | 1917 |
| 1,394,896 | Halvarsen | Oct. 25, | 1921 |
| 1,436,308 | Evans | Nov. 21, | 1922 |
| 1,740,609 | Lebbey | Dec. 24, | 1929 |
| 2,190,528 | Wright | Feb. 13, | 1940 |
| 2,488,751 | Verbeek et al. | Nov. 22, | 1949 |
| 2,666,158 | Cooper | Jan. 12, | 1954 |